United States Patent Office 3,111,540
Patented Nov. 19, 1963

3,111,540
NOVEL 2-CHLORO-4-HYDROXY - 5 - SULFAMOYL-
ACYL - BENZENESULFONAMIDES AND THE
PROCESS FOR PRODUCING THE SAME
Robert F. Meyer, Ann Arbor, Mich., assignor to Parke,
Davis & Company, Detroit, Mich., a corporation of
Michigan
No Drawing. Filed Nov. 28, 1961, Ser. No. 155,485
6 Claims. (Cl. 260—556)

The present invention relates to novel sulfonamide compounds and to means for producing the same. These compounds are represented by the formula:

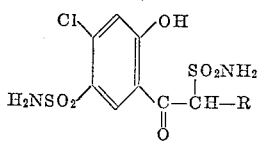

where R is hydrogen, methyl or ethyl.

In accordance with the invention, compounds having the above formula are produced by reacting a 2-hydroxy-4-chlorophenone having the formula:

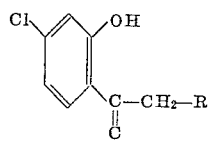

where R has the aforementioned significance, with chlorosulfonic acid and reacting the resulting sulfonyl chloride compound with ammonia. The reaction with chlorosulfonic acid is suitably carried out at temperatures in the approximate range from 50–110° C. and preferably at 95–100° C. At least two equivalents, and preferably an excess of chlorosulfonic acid, are employed. The reaction is ordinarily complete in periods ranging from 1–5 hours. The use of solvents for the reaction is unnecessary. The amination step, which proceeds readily in a short period (within about 5–10 minutes), is carried out preferably in the cold, using liquid ammonia. The reaction temperature is not critical and satisfactory results are obtained at room temperature or higher temperature; however, no advantage is gained by operating at these relatively high temperatures. Ammonia may also be supplied in other forms, such as ammonium hydroxide and the like. At least two equivalents, and preferably an excess of ammonia, are used.

The compounds of the invention possess significant diuretic properties and are relatively non-toxic. For example, the products provide significant natriuretic activity in the rat when tested orally in doses of two milligrams per kilogram or higher by procedures of the type reported in The Journal of Pharmacology and Experimental Therapeutics, volume 79, page 97 (1943). Hence, they have application as diuretic agents suitable for oral administration.

The invention is illustrated by the following example:

*Example*

2-hydroxy-4-chloro-propiophenone (58.5 g.) is added to 200 ml. of chlorosulfonic acid and the resulting solution is heated at 100° C. for 1½ hours. The reaction mixture is cooled, poured onto ice, and the solid product which separates is collected by filtration and added to liquid ammonia (100–200 ml.). The resulting mixture is dissolved in 200 ml. of water and the solution is acidified to pH 4 with concentrated hydrochloric acid. The product which separates in solid form, 2-chloro-4-hydroxy-5-(2-sulfamoylpripionyl)-benzenesulfonamide is collected by filtration and recrystallized from 95% ethanol; M.P., 245–246° C.

The corresponding products 2-chloro-4-hydroxy-5-sulfamoylacetylbenzenesulfonamide and 2-chloro-4-hydroxy-5-(2-sulfamoyl - n - butyryl)-benzenesulfonamide, are prepared by the same procedure using as a starting material 2-hydroxy-4-chloro-acetophenone (54 g.) and 2-hydroxy-4-chloro-butyrophenone (62 g.) respectively, in place of 2-hydroxy-4-chloro-propiophenone.

I claim:
1. A compound of the formula:

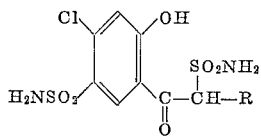

where R is selected from the group consisting of hydrogen, methyl and ethyl.

2. 2-chloro-4-hydroxy - 5 - (2 - sulfamoylpropionyl)-benzenesulfonamide.

3. 2-chloro-4-hydroxy - 5 - sulfamoylacetylbenzenesulfonamide.

4. 2-chloro-4-hydroxy - 5 - (2 - sulfamoylbutyryl)-benzenesulfonamide.

5. Process for the production of a compound of the formula:

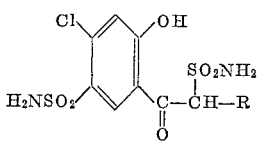

which comprises reacting 2-hydroxy-4-chlorophenone having the formula:

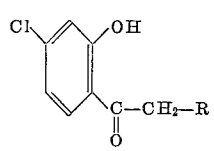

with at least two equivalents of chlorosulfonic acid at temperatures in the range from 50–110° C. and reacting the resulting sulfonyl chloride compound with at least two equivalents of ammonia; where R is selected from the group consisting of hydrogen, methyl and ethyl.

6. Process according to claim 5 wherein the reaction with the sulfonyl chloride compound is carried out with liquid ammonia.

No references cited.